United States Patent [19]

Petschke et al.

[11] Patent Number: 4,879,365

[45] Date of Patent: Nov. 7, 1989

[54] HIGH PERFORMANCE ONE-COMPONENT URETHANE COMPOSITIONS WITH EXCELLENT WEATHERING PROPERTIES AND METHOD FOR MAKING AND USING SAME

[75] Inventors: Glenn H. Petschke, Lancaster; Bernard Taub, Williamsville, both of N.Y.

[73] Assignee: NL Chemicals, Inc., New York, N.Y.

[21] Appl. No.: 270,750

[22] Filed: Nov. 14, 1988

[51] Int. Cl.$^4$ ............................................. C08G 18/28
[52] U.S. Cl. ....................................... 528/49; 528/69; 528/73; 548/216
[58] Field of Search ............................ 528/49, 69, 73; 548/215

[56] References Cited

U.S. PATENT DOCUMENTS

| | | | |
|---|---|---|---|
| 3,743,626 | 7/1973 | Emmons | 260/77.5 |
| 4,024,117 | 5/1977 | Emmons | 260/78.3 |
| 4,032,686 | 6/1977 | Emmons | 428/425 |
| 4,381,388 | 4/1983 | Naples | 528/59 |
| 4,471,102 | 9/1984 | Petschke | 528/49 |

Primary Examiner—Maurice J. Welsh
Attorney, Agent, or Firm—Michael L. Dunn

[57] ABSTRACT

A storage stable one-component air curable urethane coating composition having improved color, abrasion resistance and weather resitance comprising at least twenty percent by weight of resin solids of a compound comprising at least one oxazolidine ring chemically combined from the nitrogen atom of the ring through an alkylene-urethane linking group to a tetramethylxylylenediisocyanate prepolymer radical.

The invention also comprises the method for preparing the compound and composition and a method for coating a surface by applying the composition of the invention to the surface and exposing the applied composition to air having a relative humidity of at least 10% and incudes an article coated with the cured composition.

41 Claims, No Drawings

HIGH PERFORMANCE ONE-COMPONENT URETHANE COMPOSITIONS WITH EXCELLENT WEATHERING PROPERTIES AND METHOD FOR MAKING AND USING SAME

BACKGROUND OF THE INVENTION (A) Field of the Invention

This invention relates to polyurethane coating compositions and more particularly relates to high performance one-component polyurethane compositions with excellent weathering properties.

(B) Description of the Related Art

It has been known that polyurethanes can be formed by the reaction of isocyanates with active hydrogen compounds such as polyols (polyfunctional alcohols). Since isocyanates and active hydrogen compounds usually react very quickly even at room temperature, the two components to form the polyurethane compositions usually must be stored separately and mixed together only at the time when the coating is to be used.

Several approaches have been investigated to provide a one-component composition in which the reacting materials are combined before using and then later activated. For example, prepolymer isocyanates have been converted into derivatives of isocyanates which regenerate the isocyanate only upon heating. This heating process has several disadvantages especially when the polyurethane is to be used as a coating. It is, for example, very difficult to heat a very large surface or to heat a surface which is temperature sensitive.

Another technique for the manufacture of one-component polyurethane systems is the formation of moisture cure systems. This process involves the formation of an isocyanate prepolymer which reacts with moisture from the atmosphere to form a polymeric coating. Although this type of system has met with large success, it nevertheless suffers from certain disadvantages. For example, heavy coatings are difficult to make because of the requirement to release carbon dioxide formed by the reaction of the isocyanate with water. Furthermore, since the chain extender is water, polymer characteristics are not as good as when polyols or polyamines are used as the chain extenders in the two part urethane coating compositions. It is therefore desirable to provide polymer forming compositions which are only one-component in nature, which are stable on storage and which can be cured in the absence of any excessive heating and without the specific addition of other materials.

It is disclosed in U.S. Pat. Nos. 3,743,626; 4,024,117; and 4,032,686 that certain oxazolidine compositions and polyfunctional aliphatic or aromatic isocyanates can be cured in the presence of moisture to give polymeric materials which are suitable for coatings. It is further disclosed that some such compositions can be stored in the absence of moisture without significant reaction between the oxazolidine and the isocyanate. Unfortunately, such compositions, as disclosed in the foregoing U.S. patents, have serious disadvantages. In particular, such coatings in general have very poor color. In addition, abrasion resistance is not as high as desired. Furthermore, the oxazolidine compounds used in these compositions were difficult to prepare due to long, complex or difficult synthesis routes. High solids in the coating compositions and good strength in the coatings obtained by good crosslinking were also difficult to obtain. Additional disadvantages of many of such compounds were that they were solids or waxes which were difficult to dissolve or disperse, they were unstable during storage or required polymer chains of specific and limited chemical structure, e.g., only those formed from certain lactones.

Additionally, except for certain compositions described in U.S. Pat. No. 4,381,388, such coatings are usually not high performance coatings, i.e., they do not have the hardness, strength, or weather resistance suitable for high performance applications such as those encountered in exterior environments.

In a more recent disclosure, e.g., U.S. Pat. No. 4,471,102, it was reported that a storage-stable one-component air curable urethane coating composition having improved color and abrasion resistance as well as better weatherability could be made by reacting an isophorone diisocyanate (IPDI) prepolymer with a deficiency of 2-hydroxyethyl oxazolidine (HEOX) to form a modified isocyanate containing prepolymer. The latter on application to a substrate in the presence of low levels of atmospheric moisture reacts to form an amino alcohol which co-reacts with the residual isocyanate contained in the modified prepolymer. The composition of this U.S. patent is, however, unfortunately limited to those products containing isophorone diisocyanate, mainly because of the stability of the materials on prolonged storage. In addition, weatherability was still not as good as desired.

BRIEF DESCRIPTION OF THE INVENTION

In accordance with the present invention, there is provided a storage stable one-component air curable urethane coating composition having good color and abrasion resistance and excellent weatherability. In addition, the composition is more easily prepared than most prior art oxazolidine compositions and can optionally use inexpensive polyether polyol isocyanate prepolymers or in high performance compositions can use polyester or polycarbonate polyol isocyanate prepolymers. Additionally, high solids in the coating compositions and good crosslinking can easily be obtained.

The composition comprises at least twenty percent by weight of resin solids of a compound comprising at least one oxazolidine ring chemically combined from the nitrogen atom of the ring through an alkylene-urethane linking group to a tetramethylxylylenediisocyanate (TMXDI) prepolymer radical, which prepolymer radical contains at least one isocyanate group. Twenty percent by weight of resin solids as used herein means twenty percent by weight of the compounds in the composition which will react together to form a solid urethane resin. The oxazolidine ring in the compound will react with moisture in the air which is believed to form hydroxy and amine groups which are in turn believed to react with the isocyanate radicals to form a cured urethane-urea compound. The compound may be a liquid and is storage-stable and provides excellent weatherability.

The invention also comprises a method for preparing the compound and composition and a method for coating a surface by applying the composition of the invention to the surface and exposing the applied composition to air having a relative humidity of at least 10% and includes an article coated with the cured composition.

DETAILED DESCRIPTION OF THE INVENTION

The oxazolidine-isocyanate compound is usually a compound of the formula:

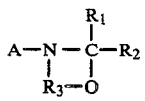

wherein $R_1$ and $R_2$ are independently at each occurrence hydrogen, lower alkyl, substituted lower alkyl of 1 to 12 carbon atoms, phenyl or substituted phenyl. $R_3$ is a substituted or unsubstituted alkylene group of two or three carbon atoms excluding substituents. A is a tetramethylxylylenediisocyanate prepolymer radical containing a urethane-alkylene group which is connected to the nitrogen atom of the ring. Suitable substituents in the $R_1$, $R_2$ and $R_3$ groups are substituents such as halogen, alkyl, isocyanate, and ester groups which do not contain an active hydrogen atom, i.e., a hydrogen atom which will react with an isocyanate group. Substituents which are unsuitable therefore include aliphatic or aromatic hydroxy groups, acid groups and primary or secondary amine groups. "Lower alkyl" usually means from 1 to 6 carbon atoms.

A particularly desirable oxazolidine-isocyanate compound is represented by the formula:

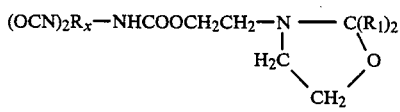

where $(OCN)_2R_x-$ is the residue of a polycarbonate, polyether or polyester isocyanate prepolymer, and $R_1$ is independently at each occurrence hydrogen, lower alkyl, substituted lower alkyl, phenyl or substituted phenyl. Most preferably $R_1$ is hydrogen.

The method for the manufacture of the composition of the invention comprises reacting an oxazolidine ring compound containing a hydroxy group connected through a substituted or unsubstituted alkylene group to the nitrogen atom of the ring, with a polycarbonate, polyester or polyether tetramethylxylylene isocyanate prepolymer containing at least two isocyanate groups. Mixtures of the foregoing prepolymers may be used with similar polycarbonate, polyester or polyether isophorone diisocyanate prepolymers provided that at least 20 and preferably at least 35 and most preferably at least 50 percent of the isocyanate groups are provided by prepolymers formed using tetramethylxylylenediisocyanate. The equivalent weight ratio of oxazolidine to prepolymer is usually between about 1:6 and about 4:6 and most commonly between about 1:3 and about 1:5. The equivalent weight of prepolymer is the weight of prepolymer required to give one mole of reactive isocyanate groups and the equivalent weight of oxazolidine is the weight required to give one mole of reactive hydroxy groups when the oxazolidine ring is unopened.

The prepolymer used in accordance with the present invention is a prepolymer formed from a polyester, polycarbonate or polyether polyol, a low molecular weight triol and tetramethylxylylenediisocyanate or mixtures of tetramethylxylylenediisocyanate and isophorone diisocyanate as previously discussed. The prepolymer is prepared by reaction of the polyol and triol with an excess of isocyanate to yield an isocyanate terminated prepolymer. Usually the equivalent weight ratio of diisocyanate to combined polyester polyol and low molecular weight polyol is from 1.4:1 to 2.5:1. Most desirably the ratio is about 2:1. Suitable reaction temperatures are usually between about 75° and 150° C. and the reaction time is usually between about 1 hour and 8 hours. Desirably, a catalyst such as dibutyltin dilaurate or the like is present in the reaction mixture to reduce the time for preparing the prepolymer.

The polyol can have a hydroxy functionality of between 2 and 3 and may be prepared by methods known in the art. Polyester polyols, for example, may be prepared by known means of reacting a dibasic acid with a diol to form a difunctional polyester polyol. A trifunctional alcohol such as trimethylol-propane can be incorporated therein to increase the functionality towards a preferred maximum of 3. Polyester polyols can also be made by the opening and subsequent polymerization of lactone rings such as caprolactone, butyrolactone or valerolactone. Such a polyester polyol that can be used in carrying out the invention is based on E-caprolactone. A polycaprolactone-diol with a functionality of 2 and made by polymerization of the monomer in the presence of a difunctional initiator can be used as well as a polycaprolactonetriol which is made by polymerization in the presence of a trifunctional initiator. Still another polyester polyol useful in this invention is a polycarbonate diol or triol, an ester of carbonic acid. These ester diols or triols are made by transesterification of monomeric carbonate esters with the proper glycols. The polyol usually has a molecular weight of between about 300 and about 2,000 and preferably from about 450 to about 1,500. Polycaprolactone esters have been reported to impart improved weather resistance and hydrolytic stability to polyurethanes containing such polyesters.

In addition to the polyester, polycarbonate, polyether or other polyol, the reaction mixture to prepare the prepolymer must contain a low molecular weight polyol, i.e., a polyol having a molecular weight below 500 and preferably below 400. The low molecular weight polyol is usually a triol such as glycerin, trimethylolethane, trimethylolpropane, hexanetriol or tris(2-hydroxyethyl) isocyanurate. The low molecular weight polyol could, however, be a tetrol such as pentaerythritol. The most preferred polyol is tris(2-hydroxyethyl) isocyanurate. The low molecular weight polyol is present in the prepolymer reaction mixture at an equivalent weight ratio (based upon a comparison of hydroxy groups) of polyester polyol to low molecular weight polyol of from 0.25:1 to 5:1 and preferably 0.5:1 to 3:1.

The reaction mixture to prepare the prepolymer for use in the compound of the invention must also contain tetramethylxylylenediisocyanate. At least 20, preferably at least 35 and most preferably at least 50 equivalent weight percent of the diisocyanate should be tetramethylxylylenediisocyanate in order to obtain significant improvement in weathering characteristics in accordance with the present invention. Sufficient diisocyanate is used to react with essentially all of the hydroxy groups of the polyester polyol and the low molecular weight polyol to form a prepolymer terminated with isocyanate groups. The equivalent weight ratio of diisocyanate to combined polyol and low molecular weight polyol is from 1.4:1 to 2.5:1 and is preferably about 2:1.

The tetramethylxylylenediisocyanate required to be used in the reaction to form the prepolymer of the composition is a diisocyanate well known in the art and is often abbreviated as TMXDI. TMXDI has the structural formula:

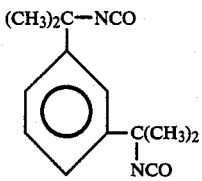

The hydroxy oxazolidine which is reacted with the prepolymer usually has the formula:

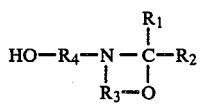

wherein $R_1$ and $R_2$ are independently at each occurrence hydrogen, lower alkyl, substituted lower alkyl of one to 12 carbon atoms, phenyl or substituted phenyl. $R_3$ is a substituted or unsubstituted alkylene group of two or three carbon atoms excluding substituents and $R_4$ is a lower alkyl.

The hydroxy oxazolidine is most commonly

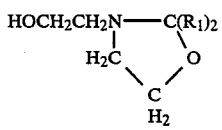

where $R_1$ is independently at each occurrence hydrogen, lower alkyl, substituted lower alkyl, phenyl or substituted phenyl.

Many of such hydroxyoxazolidines can be easily made by condensing an appropriate aldehyde or ketone with an appropriate dihydroxyl alkyl or substituted alkyl amine, such as diethanol amine.

A particularly desirable curing agent is hydroxyethyl oxazolidine wherein $R_1$ is hydrogen. Hydroxyethyl oxazolidine (HEOX) can be made by the reaction between formaldehyde and diethanolamine. Other hydroxyoxazolidines which are useful in carrying out the objects of this invention include hydroxyethyl dimethyloxazolidine made by reacting acetone with diethanolamine and hydroxyethyl-methylethyl oxazolidine made by condensing methylethyl ketone with diethanolamine.

The quantity of hydroxyethyl oxazolidine curing agent used in combination with the isocyanate prepolymer is that amount necessary for reacting the hydroxy group with only some of the three available isocyanate groups, leaving the others for reaction with the amine and hydroxy group formed after exposure of the oxazolidine ring to atmospheric moisture. The equivalent weight ratio of oxazolidine to prepolymer in the reaction is usually between about 1:6 and about 4:6 and is most commonly between 1:3 and 1:5.

The reaction temperature to form the oxazolidine-isocyanate compound from the prepolymer and the hydroxyoxazolidine is usually between about 75° and 100° C. and the reaction time is usually between about 15 minutes to one hour. It is to be understood that in reacting the hydroxyoxazolidine with the prepolymer, it is believed that in most cases only one hydroxyoxazolidine will react with a prepolymer molecule. This is especially true when there is a low equivalent weight ratio of oxazolidine to prepolymer. However, it is expected that more than one hydroxyoxazolidine will sometimes react with a single prepolymer molecule. This is especially true when a high equivalent weight ratio of oxazolidine to prepolymer is used.

The composition disclosed in this invention differs from those described in U.S. Pat. Nos. 4,381,388 and 3,743,626 in that the prepolymer is partially reacted with the oxazolidine curing agent; whereas, in the aforementioned patents, initial reaction takes place only when the product is exposed to atmospheric moisture. While not wishing to be bound by any particular theory, it is believed that the polymeric urethane formed from the composition of the invention results from a series of reactions involving atmospheric moisture, i.e.,

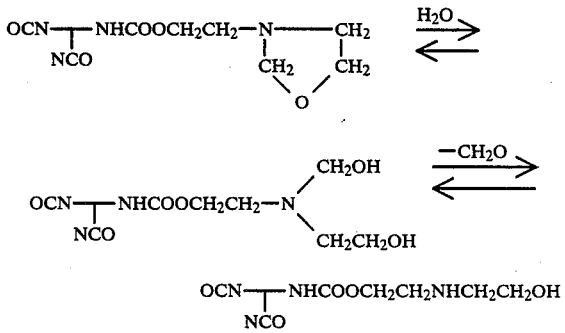

where the long lines to the NCO groups represent prepolymer chains.

The resulting amino alcohol produced contains active hydrogens which rapidly react with isocyanate groups from a different prepolymer or possibly from the same prepolymers. In essence, a highly crosslinked network is obtained upon exposure to atmospheric moisture. This coating thus exhibits better abrasion resistance and strength. In addition, when appropriate prepolymers are used, hardness and weather resistance are improved.

In making coating compositions in accordance with the present invention, the compound of the invention is generally incorporated into a carrier which is usually a solvent for the compound. The coating composition may contain small or large percentages of the compound, e.g., from a few percent to in excess of 50% by weight. The only maximum limitation upon the percentage of compound permitted is determined by the viscosity of the coating composition, i.e., whether the composition can practically be applied. In addition, the percentage may depend upon the particular carrier used and its ability to dissolve or disperse the compound. In general, the solvent or other carrier should not contain active hydrogens which will react with the compound. For this reason, water, alcohols and phenols are undesirable. In addition, other carriers should be essentially anhydrous. Examples of suitable solvents are xylene and ethoxyethyl acetate.

When the composition is coated upon a surface, atmospheric moisture initiates polymerization of the composition to form a urethane coating. A trace amount of moisture is usually all that is necessary to initiate the reaction and cure the composition.

The relative humidity of the atmosphere to which the composition is exposed is, however, desirably at least 10% and preferably 40% or higher.

The composition of the present invention differs from that disclosed in U.S. Pat. No. 4,471,102 in having even better weather resistance and in that tetramethylxylylenediisocyanate is used to replace at least a significant portion of the isophorone diisocyanate to obtain the increase in weatherability.

The composition of the invention can be used in a variety of applications including high performance applications to form articles having weather resistant top coats for substrates such as metal, plastic and wood and as adhesives and tie coats for both natural and synthetic material such as paper, textiles, glass, wood, plastics, metal or leather.

The composition of the invention is storage-stable, i.e., the one part composition can be stored at high solids at relatively low viscosity for months and by using an appropriate prepolymer can be made weather resistant, i.e., can be exposed to sunlight and water for months without a significant change in strength or surface appearance. In addition, as previously discussed, the composition results in coatings having improved abrasion resistance and superior color.

The following examples serve to illustrate and not limit the present invention.

EXAMPLE I

Into a reactor equipped with an agitator, thermometer, reflux condenser and nitrogen inlet tube were charged 367.4 parts (0.37 eq) of Rucoflex S1015-55 (neopentyl glycol hexanediol adipate with a molecular weight of 2000), 50.0 parts (1.11 eq) of trimethylolpropane, 519.8 parts of xylene and 0.5 parts of diphenylisodecyl phosphite. The solution was heated at 140° C. while azeotropically removing any waters present in the starting materials. After the drying step, the solution was cooled to 35° C. and 361.5 parts (2.96 eq) of tetramethylxylylenediisocyanate (TMXDI) and 0.26 parts of dibutyltin dilaurate were added all at once, following which the temperature was increased to 90° C. An exothermic reaction took place at about 50°–60° C. The reaction mixture was held at 90° C. until the isocyanate content reached 4.8%; e.g., ca 2.5 hours. The solution was then cooled to 70° C. and 42.4 parts (0.36 eq) of 2-hydroxyethyl oxazolidine (HEOX), 28.3 parts of xylene and 13.7 parts of triethylortho-formate were added, the temperature increased to 85° C. and held there for one hour. The mixture was cooled to room temperature and packed out. Analysis of the product indicated the following:

| Solids | 59.2% |
|---|---|
| NCO Content | 2.88% |
| Viscosity | 3.0 stokes |

EXAMPLE I-A

Using the procedure described in Example I, the following formula was used in making an isophorone diisocyanate product.

| Rucoflex S1015-55 | 445.0 parts (0.445 eq) |
|---|---|
| Trimethylolpropane | 60.0 parts (1.33 eq) |
| Xylene | 600.0 parts |
| Diphenylisodecylphosphite | 0.6 parts |
| Isophorone diisocyanate | 395.0 parts (3.559 eq) |
| Dibutyltin dilaurate | 0.3 parts |
| Hydroxyethyl oxazolidine | 52.4 parts (0.448 eq) |
| Xylene | 34.9 parts |
| Triethylorthoformate | 15.9 parts |

The product exhibited the following physical properties:

| Solids | 59.6% |
|---|---|
| NCO Content | 3.2% |
| Viscosity | 3.3 stokes |

EXAMPLE I-B

A commercial automotive refinish enamel (e.g., Imron, supplied by the E.I. DuPont Co.) was spray-applied to metal panels following the instructions of the supplier. The coated panels were then clear-coated with the urethane prepolymers described in Examples I and I-A, allowed to dry, and cured at room temperature for seven days prior to submitting them for accelerated QUV weatherability testing. The following table summarizes the coating properties of the urethanes as well as the weathering characteristics.

| | Ex. I | Ex. I-A |
|---|---|---|
| Dry Times | | |
| Set, Hrs. | ½ | ½ |
| Thru, Hrs. | 2½ | 1½ |
| Hard, Hrs. | 4 | 2½ |
| Tack-Free, Hrs. | 3 | 1 |
| Pencil Hardness | 2H | 2H |
| Impact, D/R | 160/160 | 160/160 |
| Mandrel Bend, ⅛ inch | Pass | Pass |
| Stain Resistance | Good | Good |
| Chemical Resistance | Good | Good |
| Solvent Resistance | Very Good | Very Good |
| QUV Weatherability | | |
| Gloss (60°/20°) | | |
| Initial | 94/88 | 91/82 |
| 1000 Hrs. | 94/87 | 91/79 |
| 2000 Hrs. | 93/74 | 89/68 |
| Florida Exposure | | |
| Gloss (60°/20°) | | |
| Initial | 95/90 | 91/82 |
| 4 Mos. | 93/85 | 91/73 |

EXAMPLE II

Using the procedure described in Example I, the following raw materials were used in making a harder prepolymer.

| *Caprolactone Triol having a molecular weight of 900 | 225.0 parts (0.75 eq) |
|---|---|
| Trimethylolpropane | 33.75 parts (0.75 eq) |
| Xylene | 416.8 parts |
| Diphenylisodecylphosphite | 0.3 parts |
| TMXDI | 366.0 parts (3.0 eq) |
| Dibutyltin dilaurate | 0.21 parts |
| HEOX | 42.1 parts (0.36 eq) |
| Xylene | 28.1 parts |
| Triethylorthoformate | 11.1 parts |

*Available as Tone 0310 from Union Carbide Corp.

The product obtained exhibited the following physical properties:

| Solids | 59.5% |
|---|---|
| NCO Content | 3.74% |
| Viscosity | 3.5 stokes |

EXAMPLE II-A

Using the procedure as described in Example I, the following formula was used in making an isophorone diisocyanate product.

| *Caprolactone Triol having a molecular weight of 900 | 342.0 parts (1.14 eq) |
|---|---|
| Xylene | 600.0 parts |
| Diphenylisodecylphosphite | 0.4 parts |
| Trimethylolpropane | 51.8 parts (1.152 eq) |
| Isophorone diisocyanate | 507.0 parts (4.568 eq) |
| Dibutyltin dilaurate | 0.3 parts |
| Hydroxyethyl oxazolidine | 65.9 parts (0.563 eq) |
| Xylene | 43.9 parts |
| Triethylorthoformate | 16.1 parts |

*Available as Tone 0310 from Union Carbide Corp.

The final product exhibited the following physical properties:

| Solids | 59.4% |
|---|---|
| NCO Content | 3.85% |
| Viscosity | 3.6 stokes |

EXAMPLE II-B

The products as described in Examples II and II-A were evaluated in the same manner as that in Example I-B.

|  | Ex. II | Ex. II-A |
|---|---|---|
| Dry Times | | |
| Set, Hrs. | ¼ | ¼ |
| Thru, Hrs. | 1¾ | 2 |
| Hard, Hrs. | 3¼ | 3¼ |
| Tack-Free, Hrs. | 1¼ | 1¼ |
| Pencil Hardness | 3H | 3H |
| Impact, D/R | 160/160 | 160/160 |
| Mandrel Bend, ⅛ inch | Pass | Pass |
| Stain Resistance | Very Good | Very Good |
| Chemical Resistance | Excellent | Excellent |
| Solvent Resistance | Excellent | Excellent |
| QUV Weatherability | | |
| Gloss (60°/20°) | | |
| Initial | 96/91 | 92/84 |
| 1000 Hrs. | 95/88 | 92/83 |
| 2000 Hrs. | 92/83 | 88/63 |
| Florida Exposure | | |
| Gloss (60°/20°) | | |
| Initial | 96/90 | 95/87 |
| 4 Mos. | 95/87 | 92/83 |

EXAMPLE III

Using the procedure described in Example I, the following formulation was used in making another prepolymer:

| *Caprolactone Triol having a molecular weight of 543 | 181.0 parts (1.0 eq) |
|---|---|
| Trimethylolpropane | 45.05 parts (1.0 eq) |
| Xylene | 476.4 parts |
| Diphenylisodecylphosphite | 0.3 parts |
| TMXDI | 488.0 parts (4.0 eq) |
| Dibutyltin dilaurate | 0.24 parts |
| HEOX | 55.6 parts (0.48 eq) |
| Xylene | 37.1 parts |
| Triethylorthoformate | 12.8 parts |

*Available as Tone 0305 from Union Carbide Corp.

The product obtained exhibited the following physical properties:

| Solids | 59.2% |
|---|---|
| NCO Content | 4.09% |
| Viscosity | 5 stokes |

EXAMPLE III-A

Using the procedure as described in Example I, the following formula was used in making an isophorone diisocyanate product.

| *Caprolactone Triol having a molecular weight of 543 | 243.0 parts (1.343 eq) |
|---|---|
| Trimethylolpropane | 60.5 parts (1.344 eq) |
| Xylene | 600.0 parts |
| Diphenylisodecylphosphite | 0.4 parts |
| Isophorone diisocyanate | 596.0 parts (5.369 eq) |
| Dibutyltin dilaurate | 0.3 parts |
| Hydroxyethyl oxazolidine | 78.5 parts (0.671 eq) |
| Xylene | 52.3 parts |
| Triethylorthoformate | 16.3 parts |

*Available as Tone 0305 from Union Carbide Corp.

The final product exhibited the following physical properties:

| Solids | 59.7% |
|---|---|
| NCO Content | 4.64% |
| Viscosity | 5 stokes |

EXAMPLE III-B

|  | Ex. II | Ex. II-A |
|---|---|---|
| Dry Times | | |
| Set, Hrs. | ¼ | ¼ |
| Thru, Hrs. | 3½ | 2 |
| Hard, Hrs. | 6 | 3½ |
| Tack-Free, Hrs. | 1 | 1 |
| Pencil Hardness | 4H | 4H |
| Impact, D/R | 60/F10 | 40/F10 |
| Mandrel Bend, ⅛ inch | Pass | Pass |
| Stain Resistance | Very Good | Very Good |
| Chemical Resistance | Very Good | Very Good |
| Solvent Resistance | Excellent | Execellent |
| QUV Weatherability | | |
| Gloss (60°/20°) | | |
| Initial | 96/91 | 91/79 |
| 1000 Hrs. | 95/84 | 90/79 |
| 2000 Hrs. | 92/64 | 81/40 |
| Florida Exposure | | |
| Gloss (60°/20°) | | |
| Initial | 98/92 | 92/85 |
| 4 Mos. | 93/85 | 91/80 |

A comparison of the foregoing examples clearly shows the improved weatherability of those systems incorporating TMXDI as at least part of the isocyanate.

What is claimed is:

1. A compound comprising at least one oxazolidine ring chemically combined from the nitrogen atom of the ring through an alkylene-urethane linking group to a tetramethylxylylenediisocyanate prepolymer radical, said prepolymer radical containing at least one isocyanate group.

2. The compound of claim 1 wherein the prepolymer radical contains at least two isocyanate groups and the compound contains a single oxazolidine ring.

3. The compound of claim 1 wherein the radical is a prepolymer residue of the reaction of a polyester polyol, a low molecular weight triol and an equivalent weight excess of tetramethylxylylenediisocyanate.

4. The compound of claim 3 wherein the equivalent weight ratio of isocyanate to polyol is from 1.4:1 to 2.5:1.

5. The compound of claim 1 wherein the radical is a prepolymer residue of the reaction of a polycarbonate polyol, a low molecular weight triol and an equivalent weight excess of tetramethylxylylenediisocyanate.

6. The compound of claim 5 wherein the equivalent weight ratio of isocyanate to polyol is from 1.4:1 to 2.5:1.

7. The compound of claim 1 having the generic formula:

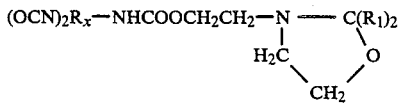

where $R_x$ is a polycarbonate, polyether or polyester isocyanate prepolymer, and $R_1$ is independently at each occurrence hydrogen, lower alkyl, substituted lower alkyl, phenyl or substituted phenyl.

8. The compound of claim 7 wherein $R_1$ is hydrogen.

9. A composition comprising the compound of claim 1 in a quantity of at least 20% by weight of solids.

10. A method for the manufacture of the composition of claim 9 which method comprises reacting an oxazolidine ring compound containing a hydroxy group connected through a substituted or unsubstituted alkylene group to the nitrogen atom of the ring, with a polycarbonate, polyester or polyether tetramethylxylylene isocyanate prepolymer containing at least two isocyanate groups.

11. The method of claim 10 wherein the equivalent weight ratio of oxazolidine to prepolymer is between about 1:6 and about 4:6.

12. The method of claim 10 wherein the prepolymer contains at least three isocyanate groups and the equivalent weight ratio of oxazolidine to prepolymer is between 1:3 and 1:5.

13. A coating composition comprising the compound of claim 1 and a carrier for said compound.

14. A coating composition comprising the compound of claim 2 and a carrier for said compound.

15. A coating composition comprising the compound of claim 4 and a carrier for said compound.

16. A coating composition comprising the compound of claim 6 and a carrier for said compound.

17. A coating composition comprising the compound of claim 8 and a carrier for said compound.

18. A coating composition comprising the composition of claim 9 and a carrier for said compound.

19. The composition of claim 9 which further comprises a carrier for the solids in the composition.

20. A method for coating a surface which comprises applying the composition of claim 13 to the surface and exposing the applied composition to air having a relative humidity of at least 10%.

21. A method for coating a surface which comprises applying the composition of claim 14 to the surface and exposing the applied composition to air having a relative humidity of at least 10%.

22. A method for coating a surface which comprises applying the composition of claim 15 to the surface and exposing the applied composition to air having a relative humidity of at least 10%.

23. A method for coating a surface which comprises applying the composition of claim 16 to the surface and exposing the applied composition to air having a relative humidity of at least 10%.

24. A method for coating a surface which comprises applying the composition of claim 17 to the surface and exposing the applied composition to air having a relative humidity of at least 10%.

25. A method for coating a surface which comprises applying the composition of claim 18 to the surface and exposing the applied composition to air having a relative humidity of at least 10%.

26. A method for coating a surface which comprises applying the composition of claim 19 to the surface and exposing the applied composition to air having a relative humidity of at least 10%.

27. An article coated with a cured composition comprising the compound of claim 1.

28. An article coated with a cured composition comprising the compound of claim 2.

29. An article coated with a cured composition comprising the compound of claim 3.

30. An article coated with a cured composition comprising the compound of claim 4.

31. An article coated with a cured composition comprising the compound of claim 5.

32. An article coated with a cured composition comprising the compound of claim 6.

33. An article coated with a cured composition comprising the compound of claim 9.

34. A polyurethane composition which comprises a moisture cured film of the compound of claim 1.

35. A polyurethane composition which comprises a moisture cured film of the compound of claim 2.

36. A polyurethane composition which comprises a moisture cured film of the compound of claim 3.

37. A polyurethane composition which comprises a moisture cured film of the compound of claim 4.

38. A polyurethane composition which comprises a moisture cured film of the compound of claim 5.

39. A polyurethane composition which comprises a moisture cured film of the compound of claim 6.

40. A polyurethane composition which comprises a moisture cured film of the composition of claim 9.

41. A method for manufacturing a composition according to claim 9 which comprises reacting an oxazolidine ring compound containing a hydroxy group connected through a substituted or unsubstituted alkylene group to the nitrogen atom of the ring, with a polycarbonate, polyester or polyether prepolymer containing at least two isocyanate groups wherein at least 20 numerical percent of the isocyanate groups in the prepolymer are residues of tetramethylxylylenediisocyanate.

* * * * *